United States Patent [19]

Shudo

[11] Patent Number: 5,270,529
[45] Date of Patent: Dec. 14, 1993

[54] DEVICE FOR SENSING ROTARY HEAD POSITION OF MAGNETIC RECORDING AND REPRODUCING APPARATUS

[75] Inventor: Katsuyuki Shudo, Yokosuka, Japan

[73] Assignee: Victor Company of Japan, Ltd., Yokohama, Japan

[21] Appl. No.: 887,491

[22] Filed: May 26, 1992

[30] Foreign Application Priority Data

May 24, 1991 [JP] Japan .................. 3-149868

[51] Int. Cl.$^5$ ............................................. G11B 5/55
[52] U.S. Cl. ................................. 250/205; 250/222.1; 360/77.12
[58] Field of Search ............... 250/205, 548, 559, 561, 250/570, 222.1; 360/77.12, 78.11; 369/44.14, 44.35, 44.32

[56] References Cited

U.S. PATENT DOCUMENTS

| | | | |
|---|---|---|---|
| 3,582,661 | 6/1971 | Emmasingel | 250/205 |
| 3,944,813 | 3/1976 | Fowler | 250/205 |
| 4,074,143 | 2/1978 | Rokos | 250/205 X |
| 4,639,796 | 1/1987 | Solhjell | 360/77.12 |
| 5,130,556 | 7/1992 | Duncan et al. | 250/561 X |

FOREIGN PATENT DOCUMENTS

52-117105 10/1977 Japan .

*Primary Examiner*—David C. Nelms
*Assistant Examiner*—John R. Lee
*Attorney, Agent, or Firm*—Lowe, Price, LeBlanc & Becker

[57] ABSTRACT

An apparatus of sensing a position for a recording and reproducing device, having first and second light receiving devices of the same photoelectric transfer characteristic, a light emitting device opposite to the first and second light receiving devices, a device entering part of light from the light emitting device into the first light receiving device, the luminous energy of light received by the first light receiving device being independent of a position of the recording and reproducing device, a device entering part of light from the light emitting device into the second light receiving device, the luminous energy of light received by the second light receiving device depending on the position of the recording and reproducing device, and a device controlling the luminous energy of light emitted by the light emitting device so that an output of the first light receiving device is continuously uniform. The apparatus produces an accurate positional signal of the recording and reproducing device independent of narrow and wide changes in environment temperature. A use of a pair of corresponding apparatuses produces a differential signal of complementary positional signals of the recording and reproducing device which is free from a drift at the home position of the recording and reproducing device.

9 Claims, 4 Drawing Sheets

DEVICE FOR SENSING ROTARY HEAD POSITION OF MAGNETIC RECORDING AND REPRODUCING APPARATUS

BACKGROUND OF THE INVENTION

1. Field of the Invention

The present invention relates to an apparatus of sensing a position for a recording and reproducing device.

2. Description of the Related Art

An example of a magnetic recording and reproducing apparatus of recording and reproducing information stored on a magnetic tape using a rotary magnetic head is a video tape recorder (VTR). As is widely known, the picture quality and the functions of a VTR have been rapidly enhanced until now since the VTR was developed. The present state is that a development of a digital VTR recording digital signals continues.

The VTR recording and reproducing information on and from the magnetic tape using the rotary magnetic head has been usually used in recording continuous images such as contents of a television broadcasting program and video signals from a television camera. There is now an attempt to employ the VTR as a component of a system such as a storage of a digital information processing system.

When the digital information processing system employs the VTR as its component such as an auxiliary external storage of a computer and an apparatus of sequentially recording images of computer graphics at the end of a computation and then successively reproducing the images to produce an animation, the VTR must reliably and stably record information on a unit of one to a few recording tracks on the magnetic tape, since the digital information processing system often stores the information on the unit of one to a few recording tracks.

When the VTR with the rotary magnetic head records information on a particular recording track on the magnetic tape or rewrites recorded information on a particular recording track on the magnetic tape, the VTR: (1) previously prerolls the magnetic tape before a record start position, passes the magnetic tape from before the record start position and past the record start position at a predetermined tape speed when recording, and starts to record information on the predetermined number of recording tracks on the magnetic tape from the record start position or: (2) produces a control pulse, controls a rotational position of the drive shaft of a capstan motor to stop the magnetic tape at a recording position and then cause the rotary magnetic head to record information on the stopped magnetic tape.

The first prior-art method is now employed in an assembly recording mode and an insert recording mode of an editor function of the VTR. The first method is unsuitable to the case in which the VTR frequently records since it requires repeated cycles of magnetic tape rewind and feed and heavily loads a tape travelling mechanism and the magnetic tape. In addition, it is difficult to accurately select a recording track on the magnetic tape since a relative movement of the rotary magnetic head to the travelling magnetic tape determines the recording track on which the rotary magnetic head records information. In addition, it is impossible to reduce time intervals in recording since the prerolling is time-consuming.

The second prior-art method lightly loads the tape travelling mechanism and the magnetic tape, since the second method eliminates the need for the rewinding of the magnetic tape which is required by the first method and the rotary magnetic head records on the stopped magnetic tape. It also enables the recording track on the magnetic tape to be easily accurately selected. A track pattern produced on the magnetic tape in recording differs from a track pattern that produced in response to a locus of the rotary magnetic head on the magnetic tape travelling at a predetermined tape speed since the rotary magnetic head records on the stopped magnetic tape. When the rotary magnetic head plays back at the predetermined tape speed the magnetic tape which has recorded information by the second method, the rotary magnetic head cannot accurately follow the recording track. In addition, it is difficult to employ a magnetic tape in such a manner that the same magnetic tape contains both a track which recorded information by the second method and a track which recorded information while travelling at a predetermined tape speed.

In order to overcome problems in the above-described first and second prior-art method, a VTR has been proposed which comprises an actuator controlling the rotation of the rotary magnetic head in an intermittent recording in response to positional signals of the rotary magnetic head produced in response to absolute positions of the rotary magnetic head on a reference edge of the magnetic tape so that a locus of the rotary magnetic head produces the same recording track on the magnetic tape in a position of stopping every time the magnetic tape has intermittently travelled predetermined distances in the direction of travelling of the magnetic tape as a recording track on the magnetic tape in a position of travelling at a predetermined tape speed which is produced in response to a locus of the rotary magnetic head on the travelling magnetic tape.

This VTR requires a stable accurate detection of positions of the rotary magnetic head. In this connection, Japanese unexamined patent application publication SHO.52-117105, for example, discloses a prior-art apparatus of which a strain gauge sticking to an electromechanical device or transducer made of an electrostrictive material detects a displacement of an actuator in order to detect a movement of the rotary magnetic head. However, this apparatus cannot detect the positions of the rotary magnetic head although it differentiates the detected displacement of the actuator to produce a speed signal of the actuator and feeds the speed signal back to a drive circuit for the actuator, thereby suppressing a free oscillation of the actuator. This apparatus, which employs an amount of warpage in the electrostrictive material of the electromechanical device for detecting the displacement of the actuator, cannot accurately detect the positions of the rotary magnetic head since the amount of warpage has a hysteresis and the state of the warpage depends on a temperature.

Therefore, the assignee in Japan of this invention previously proposed a system sensing positions of a recording and reproducing device and free from the problems in the apparatus of the above patent application publication. This system comprises two positional sensors of the same input-output characteristic for the recording and reproducing device, out puts of the positional sensors complementing each other independently of the positions of the recording and reproducing device, and means for producing a differential signal from the outputs of the positional sensors.

This system increases the accuracy of a positioning of the recording and reproducing device, fully nulls a drift in the normal or home position of the recording and reproducing device, produces positional signals of a good S/N by means of an addition of signal components and a subtraction of random noise components, and nulls external noises such as an external disturbance light by means of the subtraction. This system also approximately compensates changes in the outputs of the positional sensors due to a change in environment temperature by means of adding a simple temperature compensating circuit to the system when environment temperature narrowly changes. On the other hand, when environment temperature widely changes, the temperature compensating circuit cannot fully compensate changes in the outputs of the positional sensors due to a change in the luminous energy of light from a light emitting diode and due to a change in the photoelectric current of a photodiode. Therefore, measurements for improving a drawback in this system have been demanded since the system has a large error.

SUMMARY OF THE INVENTION

An object of the present invention is to provide an apparatus of sensing a position of a recording and reproducing device which enables a drive for the recording and reproducing device to accurately position the device independently of narrow and wide changes in environment temperature.

The first aspect of the present invention comprises first and second light receiving devices of the same photoelectric transfer characteristic, a light emitting device opposite to said first and second light receiving devices, means for entering part of light from said light emitting device into said first light receiving device, the luminous energy of light received by said first light receiving device being independent of a position of the recording and reproducing device, means for entering part of light from said light emitting device into said second light receiving device, the luminous energy of light received by said light receiving device depending on the position of the recording and reproducing device, and means for controlling the luminous energy of light emitted by said light emitting device so that an output of said first light receiving device is continuously uniform.

The apparatus produces an accurate positional signal of a good S/N of the recording and reproducing device independent of narrow and wide changes in environment temperature.

A second aspect of the present invention comprises two detector units detecting the position of the recording and reproducing device, each of said detector units comprising first and second light receiving devices of the same photoelectric transfer characteristic, a light emitting device opposite to the first and second light receiving devices, means for entering part of light from the light emitting device into the first light receiving device, the luminous energy of light received by the first light receiving device being independent of a position of the recording and reproducing device, means for entering part of light from the light emitting device into the second light receiving device, the luminous energy of light received by the light receiving device depending on the position of the recording and reproducing device, and means for controlling the luminous energy of light emitted by the light emitting device so that an output of the first light receiving device is continuously uniform, said detector units being arranged so that outputs of the second light receiving devices complement each other independently of the position of the recording and reproducing device, and means for producing a differential signal of the outputs of the second light receiving devices.

The differential signal provides an accurate positional signal of the recording and reproducing device free from a drift at the home position of the device.

DESCRIPTION OF THE PREFERRED EMBODIMENTS

Figure 1:
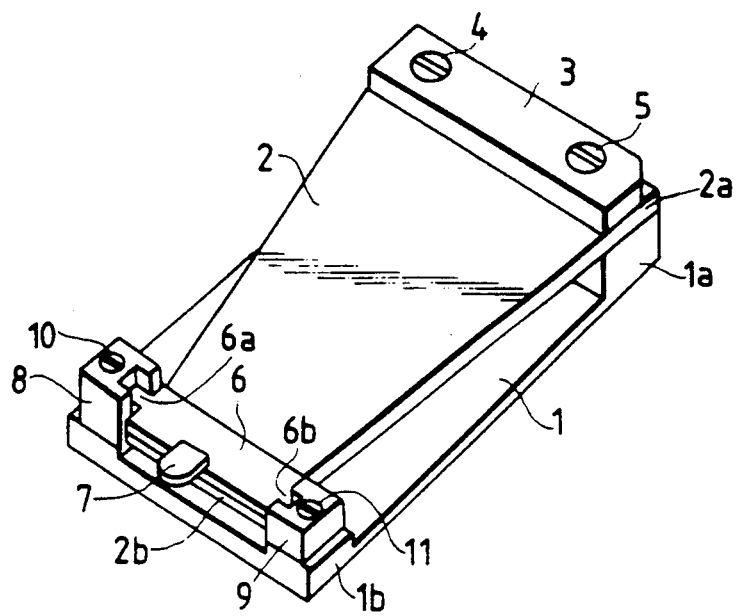
FIG. 1 is a perspective view of a drive for a recording and reproducing device and having an apparatus of sensing a position of the recording and reproducing device according to the present invention.

A preferred embodiment of the present invention will be described with reference to the drawings hereinafter.

In FIGS. 1, 2, 3 and 4, a base plate is indicated at 1, rear and front mounts projecting upwards from the upper surface of the base plate 1 are indicated at $1a$ and $1b$, and a platelike bimorph made of electrostrictive materials and used as an electromechanical device or a transducer is indicated at 2. A retaining plate 3 and the rear mount $1a$ of the base plate 1 sandwich a rear end $2a$ of the bimorph 2. Screws 4 and 5 fasten the retaining plate 3 and the rear end $2a$ of the bimorph 2 to the rear mount $1a$ of the base plate 1.

The front end $2b$ of the bimorph 2 has an operating plate 6 of a position sensing portion. The operating plate 6 which is fastened to the upper surface of the front end $2b$ of the bimorph 2 has a recording and reproducing device 7 (e.g., a magnetic recording and playback head) fixedly mounted to the upper surface of the operating plate 6. The opposite ends of the operating plate 6 have extensions $6a$ and $6b$ extending on opposite extensions of the central axis of the operating plate 6. As best shown in FIG. 4, the extension $6a$ of the operating plate 6 passes through an optical path between a light emitting unit $LSD_8$ and a light receiving unit $PDD_8$ of a photointerrupter 8 constituting a position sensor. The extension $6b$ of the operating plate 6 also passes through an optical path between a light emitting unit $LSD_9$ and a light receiving unit $PDD_9$ of a photointerrupter 9 constituting a position sensor. The photointerrupters 8 and 9 have the same input-output characteristic.

The photointerrupter 8 has a structure in which the light receiving unit $PDD_8$ comprised of two light receiving devices $PDm_8$ and $PDs_8$ of the same photoelectric transfer characteristic is opposite to the light emitting unit LSD$_8$ of a single light emitting device LS$_8$ with a clearance and the photointerrupter 9 has a structure in which the light receiving unit PDD$_9$ of two light receiving devices PDm$_9$ and PDs$_9$ of the same photoelectric transfer characteristic is opposite to the light emitting unit LSD$_9$ of a single emitting device LS$_9$ with a clearance.

Figure 3A:
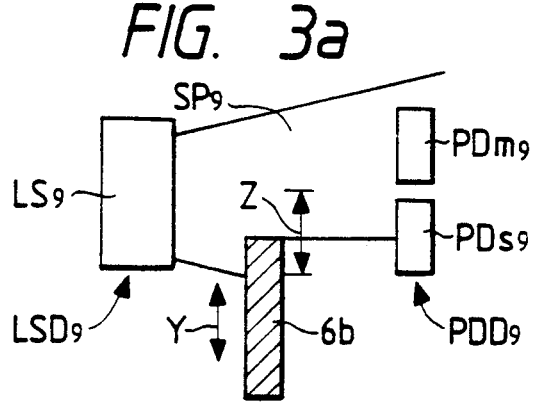
FIG. 3a is a diagrammatic side elevation of the position sensing portion of the position sensing apparatus of FIG. 1.
Figure 3B:
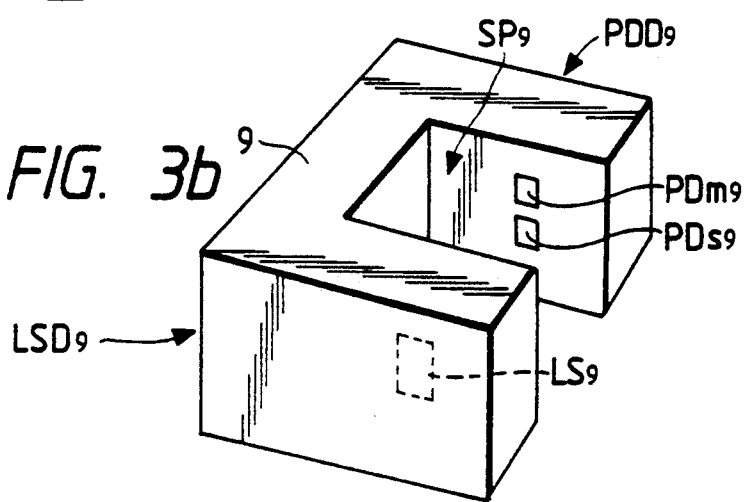
FIG. 3b is a perspective view of the position sensing portion of the position sensing apparatus of FIG. 1.
Figure 2A:
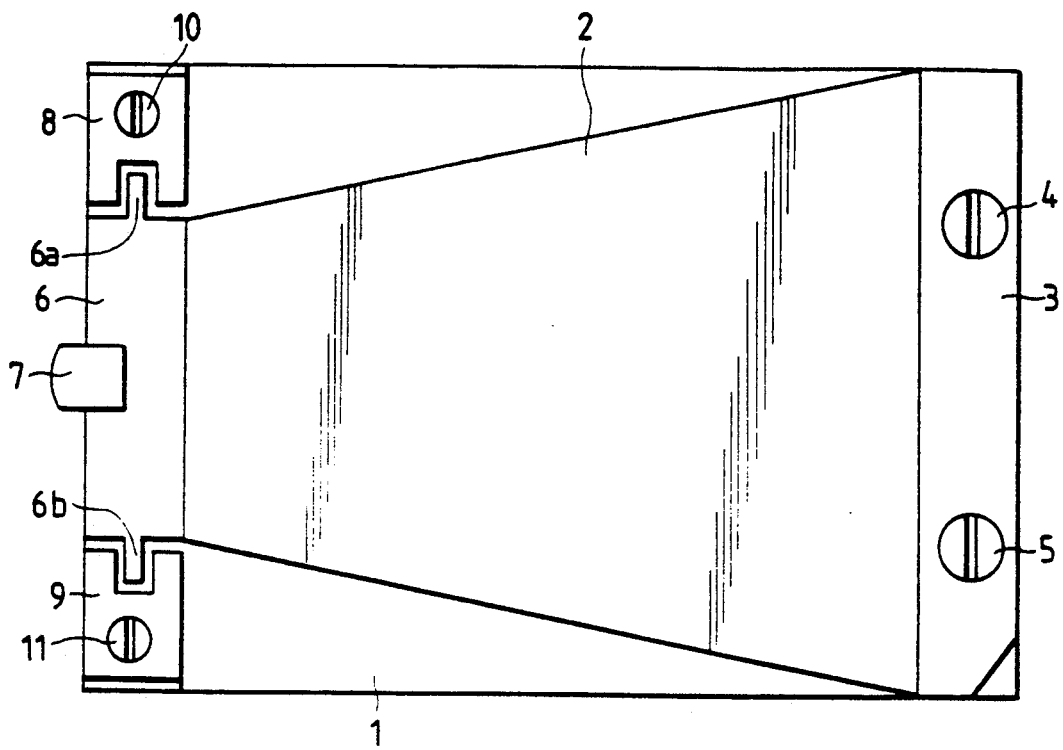
FIG. 2a is a plan view of the drive of FIG. 1.
Figure 2B:
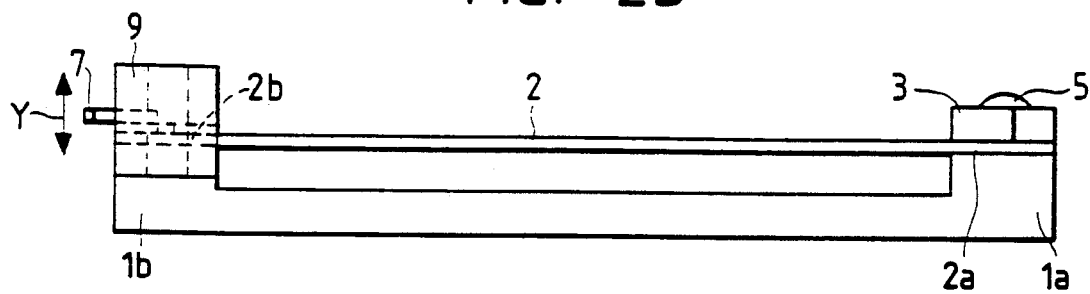
FIG. 2b is a side elevation of the drive of FIG. 1.
Figure 2C:
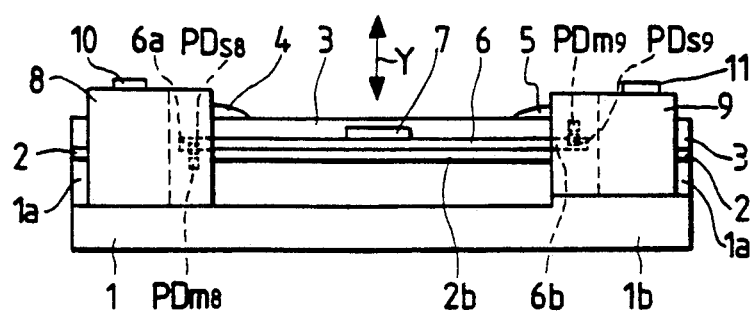
FIG. 2c is a front elevation of the drive of FIG. 1.

FIG. 3a is an illustration of a principle of operation of the photointerrupter 9. FIG. 3b is a perspective view of the photointerrupter 9. Since a principle of operation and the structure of the photointerrupter 8 are identical to those of the photointerrupter 9 except an arrangement of the light emitting device LSD$_8$ and the light receiving devices PDm$_8$ and PDs$_8$ is rotation-symmetrical with an arrangement of the light emitting device LSD$_9$ and the light receiving devices PDm$_9$ and PDs$_8$ through the home position of a recording and reproducing device 7, only the photointerrupter 9 will be described hereinafter without numeral suffixes of the light emitting unit LSD$_9$, the light receiving unit PDD$_9$, the light emitting device LS$_9$, the light receiving device PDm$_9$ and the light receiving device PDs$_9$. The light emitting device LS may comprise, e.g., a light emitting diode. The light receiving devices PDm and PDs comprise, e.g., photodiodes or phototransistors of the same photoelectric transfer characteristic. The light receiving devices PDm and PDs may comprise light receiving devices of the same photoelectric transfer characteristic selected from, e.g., the group of a great number of discrete light receiving devices of the same specifications. The light receiving devices PDm and PDs are preferably one-piece, e.g., a unit of two light receiving devices concurrently produced on the same semiconductor substrate.

The light emitting unit LSD and the light receiving unit PDD of the photointerrupter are integrally formed so that light from the light emitting device LS enters the light receiving devices PDm and PDs through a spacing SP between the light emitting unit LSD and the light receiving unit PDD.

The light receiving device PDm is so positioned in the light receiving unit PDD that the luminous energy of light from the light emitting device LS to the light receiving device PDm is independent of a displacement in the direction of Y-axis of the extension of the operating plate 6 moving in the direction of Y-axis together with a recording and reproducing device 7 within the spacing SP when the extension of the operating plate 6 is displaced within a predetermined range Z in the direction of Y-axis as shown in FIG. 3a.

On the other hand, the light receiving device PDs is so positioned in the light receiving unit PDD that the luminous energy of light from the light emitting device LS received by the light receiving device PDs depends on the displacement in the direction of Y-axis of the extension of the operating plate 6, when the extension of the operating plate 6 is displaced within the range Z in the direction of Y-axis.

A feedback luminous energy control system (see FIG. 5) between an electrical output of the light receiving device PDm and an electrical input of the light emitting device LS which has an optical path between the light emitting device LS and the light receiving device PDm as a negative feedback automatically controls the luminous energy of light from the light emitting device LS so that the output of the light receiving device PDm is continuously uniform independently of a change in environmental temperature. Thus, the magnitude of the output of the light receiving device PDs, which receives part of light from the light emitting device LS, accurately depends on the position of the recording and reproducing device 7 independently of a change in environmental temperature.

Figure 4A:
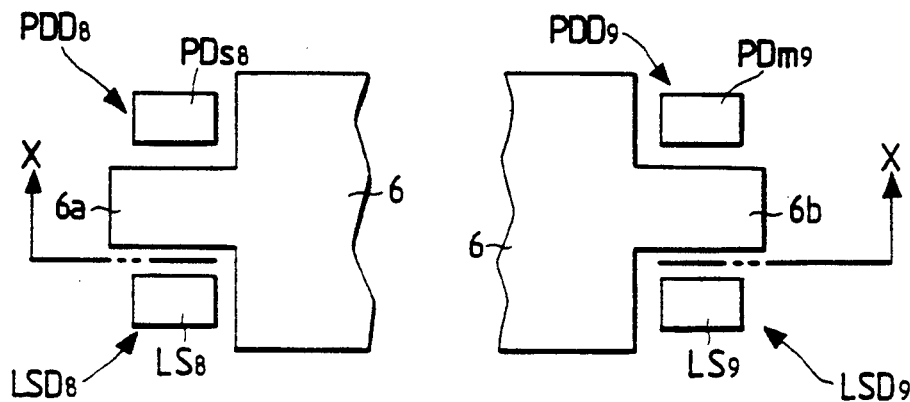
FIG. 4a is a diagrammatic cutaway plan view of the position sensing portion of the position sensing apparatus of FIG. 1.
Figure 4B:
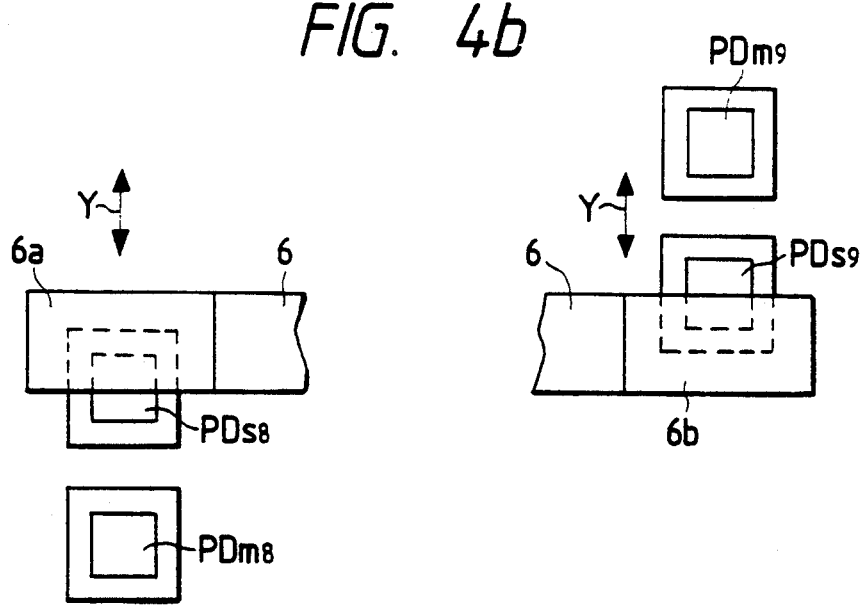
FIG. 4b is a diagrammatic cutaway side view of the position sensing portion of the position sensing apparatus of FIG. 1.

A rotation-symmetrical arrangement through the home position of the recording and reproducing device 7, as shown in FIG. 4b, of the two sets of the light emitting device LS$_8$ and the light receiving devices PDm$_8$ and PDs$_8$ of the photointerrupter 8 and the light emitting device LS$_9$ and the light receiving devices PDm$_9$ and PDs$_9$ of the photointerrupter 9 and the symmetrical arrangement, as shown in FIG. 4b, of extensions 6a and 6b of the operating plate 6 continuously complement the outputs of the light receiving device PDs$_8$ of the photointerrupter 8 and the light receiving device PDs$_9$ of the photointerrupter 9 each other independently of the position on Y-axis of the recording and reproducing device 7. Thus, a provision of a differential signal between the outputs of the light receiving device PDs$_8$ of the photointerrupter 8 and the light receiving device PDs$_9$ of the photointerrupter 9 enables position signals of the recording and reproducing device 7 to be completely free of a drift in the home or normal position of the recording and reproducing device 7 and to have a high S/N, so that the drive easily increases the accuracy of the positioning of the recording and reproducing device 7.

FIGS. 4a and 4b illustrate that the luminous energy of part of light from the light emitting devices LS$_8$ and LS$_9$ received by the light receiving devices PDm$_8$ and PDm$_9$ are independent of the displacement in the direction of Y-axis of the extensions 6a and 6b of the operating plate 6 and that the luminous energy of part of light from the light emitting devices LS$_8$ and LS$_9$ received by the light receiving devices PDs$_8$ and PDs$_9$ depends on the displacement of the extensions 6a and 6b of the operating plate 6. FIG. 4b is a view of an arrangement of the operating plate 6 and the light receiving devices PDm$_8$, PDs$_8$, PDm$_9$ and PDs$_9$ taken along the line X—X in FIG. 4a. As seen in FIG. 4b, the light receiving devices PDs$_8$ and PDs$_9$ of the photointerrupters 8 and 9 are so arranged in a rotation symmetry through the home position of the recording and reproducing device 7 that symmetrical light interceptions by the extensions 6a and 6b of the operating plate 6 continuously complement the luminous energy of light received by the light receiving devices PDs$_8$ and PDs$_9$.

Therefore, the outputs of the light receiving devices PDs$_8$ and PDs$_9$ of the photointerrupters 8 and 9 continuously complement each other independently of the displacements in the direction of Y-axis of the extensions 6a and 6b of the operating plate 6. In FIG. 4b, inner square portions of the light receiving devices PDm$_8$, PDm$_9$, PDs$_8$ and PDs$_9$ are light receiving surfaces of their photoelectric units.

Figure 5:
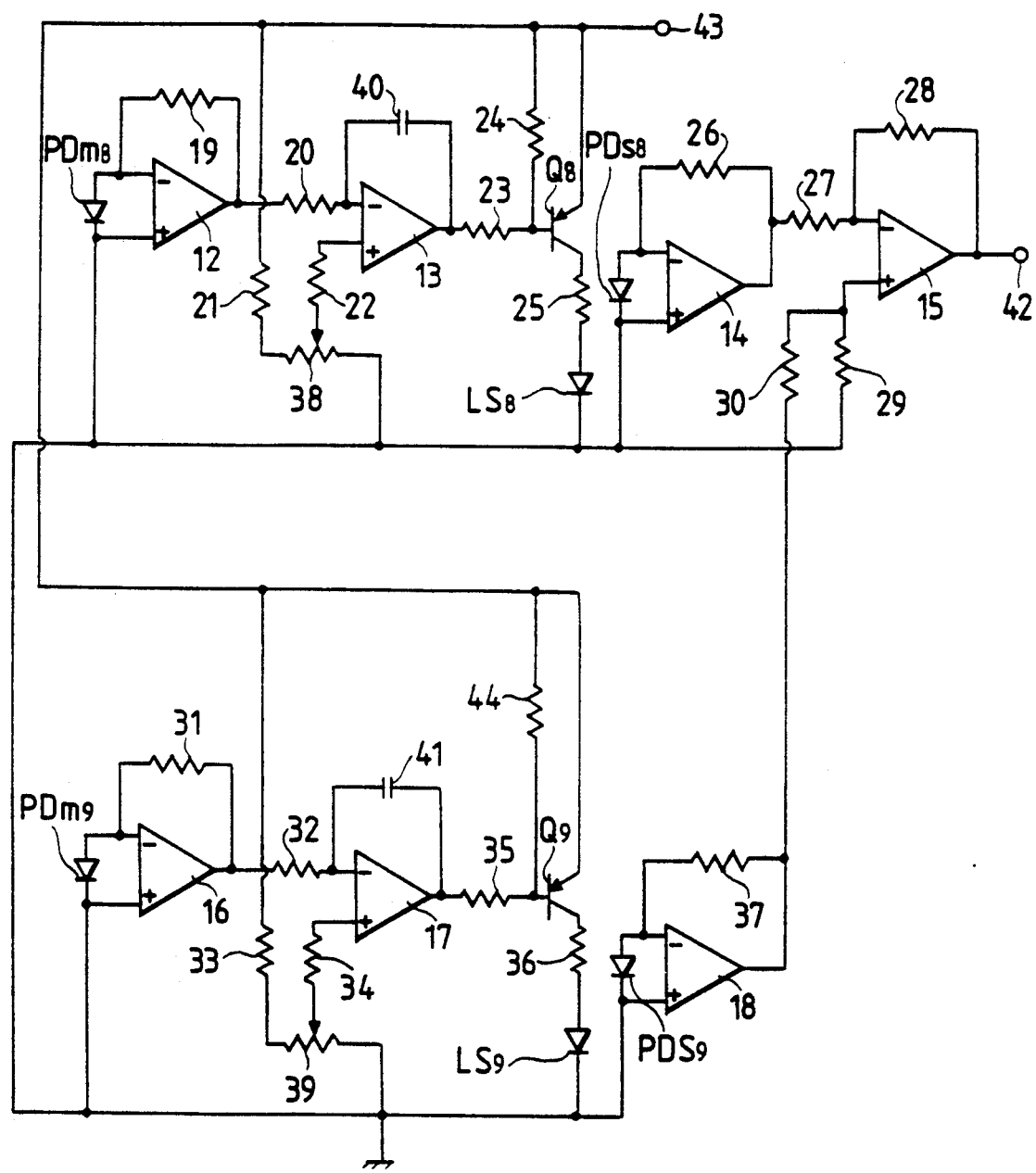
FIG. 5 is a circuit diagram of the position sensing apparatus of FIG. 1.

FIG. 5 is a circuit diagram of the apparatus of sensing the position of the recording and reproducing device according to an embodiment of the present invention. As seen in FIG. 5, light from the light emitting device LS$_8$ of the photointerrupter 8 enters the light receiving devices PDm$_8$ and PDs$_8$ of the photointerrupter 8 and light from the light emitting device LS$_9$ of the photointerrupter 9 enters the light receiving devices PDm$_9$ and PDs$_9$ of the photointerrupter 9. In FIG. 5, operational amplifiers are indicated at 12-18, fixed resistors are indicated at 19-37 and 44, variable resistors are indicated at 38 and 39, capacitors are indicated at 40 and 41, an output terminal of the apparatus of sensing the position for the recording and reproducing device is indicated at 42, transistors are indicated at $Q_8$ and $Q_9$, the light emitting devices are indicated at $LS_8$ and $LS_9$, and the light receiving devices are indicated at $PDm_8$, $PDs_8$, $PDm_9$ and $PDs_9$.

A configuration of the light receiving device $PDm_8$, the operational amplifiers 12 and 13, the transistor $Q_8$, the light emitting device $LS_8$, the fixed resistors 19–25, the variable resistors 38 and the capacitor 40 shown in FIG. 5 constitutes the feedback luminous energy control system between the electrical output of the light receiving device $PDm_8$ and the electrical input of the light emitting device $LS_8$ having the optical path between the light receiving device $PDm_8$ and the light emitting device $LS_8$ as the negative feedback and making the output of the light receiving device $PDm_8$ constant. That is, the automatic luminous energy control system controls the luminous energy of light from the light emitting device $LS_8$ so that a voltage output of the operational amplifier 12 receiving the output of the light receiving device $PDm_8$ equals a voltage set by a slide of the variable resistor 38.

A configuration of the light receiving device $PDm_9$, the operational amplifiers 16 and 17, the transistor $Q_9$, the light emitting device $LS_9$, the fixed resistors 31–36 and 44, the variable resistors 39 and the capacitor 41 shown in FIG. 5 constitutes the feedback luminous energy control system between the electrical output of the light receiving device $PDm_9$ and the electrical input of the light emitting device $LS_9$ having the optical path between the light receiving device $PDm_9$ and the light emitting device $LS_9$ as the negative feedback and making the output of the light receiving device $PDm_9$ constant. That is, the automatic luminous energy control system controls the luminous energy of light from the light emitting device $LS_9$ so that a voltage output of operational amplifier 16 receiving the output of the light receiving device $PDm_9$ equals a voltage set by a slide of the variable resistor 39.

The current to voltage converting operational amplifier 14 receives a current output of the light receiving device $PDs_8$ and then applies a corresponding voltage output to an inverting input of the operational amplifier 15. The current to voltage converting operational amplifier 18 receives a current output of the light receiving device $PDs_9$ and then applies a corresponding voltage output to a non-inverting input of the operational amplifier 15.

Since the two inputs to the operational amplifier 15 from the light receiving devices $PDs_8$ and $PDs_9$ of the photointerrupters 8 and 9 continuously complement each other independently of the displacement in the direction of Y-axis of the extensions 6a and 6b of the operating plate 6, position signals of the recording and reproducing device 7 at the output terminal 42 of the apparatus are fully free from the drift at the home position of the recording and reproducing device 7 and has the good S/N. Thus, the apparatus of sensing the position for the recording and reproducing device has no error and easily increases the accuracy of the positioning for the recording and reproducing device even if environment temperature widely changes.

What is claimed is:

1. An apparatus for sensing a position of a recording and reproducing device, the recording and reproducing device being moved in a predetermined direction by an electromechanical transducer, comprising:

two detector units detecting the position of the recording and reproducing device, each of said detector units comprising:
first and second light receiving devices having the same photoelectric characteristic,
a light emitting device opposite to the first and second light receiving devices,
means for entering part of light from the light emitting device into the first light receiving device, the luminous energy of light received by the first light receiving device being independent of the position of the recording and reproducing device,
means for entering part of light from the light emitting device into the second light receiving device, the luminous energy of light received by the second light receiving device depending on the position of the recording and reproducing device,
means for controlling the luminous energy of light emitted by the light emitting device so that an output of the first light receiving device is continuously uniform,
said detector units being rotationally symmetrically arranged about a home position of the recording and reproducing device in said direction so that outputs of the second light receiving devices complement each other independently of the position of the recording and reproducing device and so that outputs of the first light receiving devices cancel each other independently of the position of the recording and reproducing device; and
means for producing a differential signal of the outputs of the second light receiving devices.

2. The apparatus as recited in claim 1, wherein each of said detector units comprises an element having said first and second light receiving devices and said light emitting device opposite to said first and second light receiving devices with a predetermined clearance.

3. The apparatus as recited in claim 2, wherein said light emitting device and second light receiving devices of each of said detector units are arranged in a one-chip form.

4. The apparatus as recited in claim 1, wherein said controlling means comprises a feedback control system controlling the luminous energy of light from said light emitting device, the feedback control system having an optical path between said light emitting device and said first light receiving device as a negative feedback.

5. The apparatus as recited in claim 2, wherein said controlling means comprises a feedback control system controlling the luminous energy of light from said light emitting device, the feedback control system having an optical path between said light emitting device and said first light receiving device as a negative feedback.

6. The apparatus as recited in claim 1, wherein said controlling means comprises a feedback control system controlling the luminous energy of said light emitting device, the feedback control system having a negative feedback from an electrical output of said first light receiving device to an electrical input of said light emitting device.

7. The apparatus as recited in claim 2, wherein said controlling means comprises a feedback control system controlling the luminous energy of said light emitting device, the feedback control system having a negative feedback from an electrical output of said first light receiving device to an electrical input of said light emitting device.

8. The apparatus as recited in claim 3, wherein the light emitting device is a photodiode and the second light receiving devices are phototransistors, the light emitting device and the second light receiving devices of each of said first and second detector units being formed on the same semiconductor substrate.

9. An apparatus of sensing a position of a recording and reproducing device, the recording and reproducing device being moved in a single direction by an electromechanical transducer, comprising:
   first and second detector units detecting the position of the recording and reproducing device, each of said detector units comprising:
      first and second light receiving devices having the same photoelectric characteristic,
   a light emitting device opposite to the first and second light receiving devices through an optical path,
   means for entering part of light from the light emitting device into the first light receiving device, the luminous energy of light received by the first light receiving device being independent of position of the recording and reproducing device,
   means for entering part of light from the light emitting device into the second light receiving device, the luminous energy of received by the second light receiving device depending on the position of the recording and reproducing device,
   means for controlling the luminous energy of light emitted by the light emitting device so that an output of the first light receiving device is continuously uniform, and
   said first and second detector units being rotationally symmetrically arranged about a home position of the recording and reproducing device in said direction so that outputs of the second light receiving devices complement each other independently of the position of the recording and reproducing device and so that outputs of the first light receiving devices cancel each other independently of the position of the recording and reproducing device;
   an operating plate of the electromechanical transducer to which the recording and reproducing device is fastened, said operating plate passing in said direction through said optical path between the light emitting device and the light receiving devices of each of said detector units; and
   means for producing a differential signal of the outputs of the second light receiving devices of said first and second detector units.

* * * * *